E. J. SWEETLAND.
FILTER.
APPLICATION FILED MAR. 15, 1915. RENEWED JUNE 6, 1919.

1,343,182.

Patented June 8, 1920.
4 SHEETS—SHEET 1.

WITNESSES:
Charlton J. Milam.
W. P. Hammond

Ernest J. Sweetland INVENTOR.

BY
G. E. Terwilliger ATTORNEY

E. J. SWEETLAND.
FILTER.
APPLICATION FILED MAR. 15, 1915. RENEWED JUNE 6, 1919.
1,343,182.
Patented June 8, 1920.
4 SHEETS—SHEET 2.
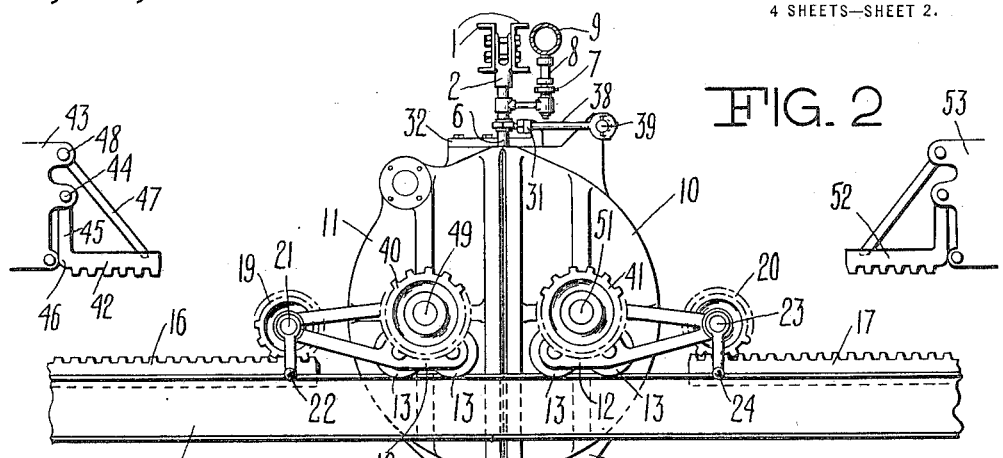
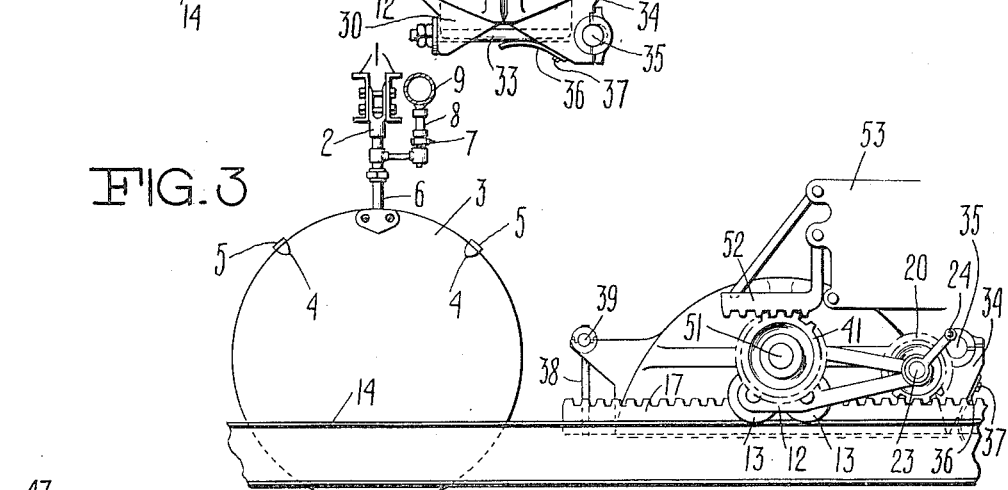
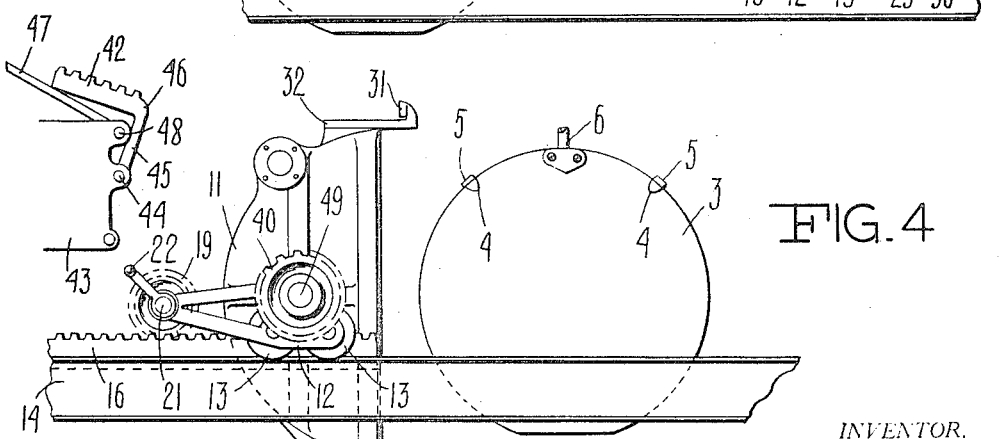
WITNESSES:
Charlton J. Wilson
W. P. Hammon
INVENTOR.
Ernest J. Sweetland
BY
G. E. Terwilliger ATTORNEY

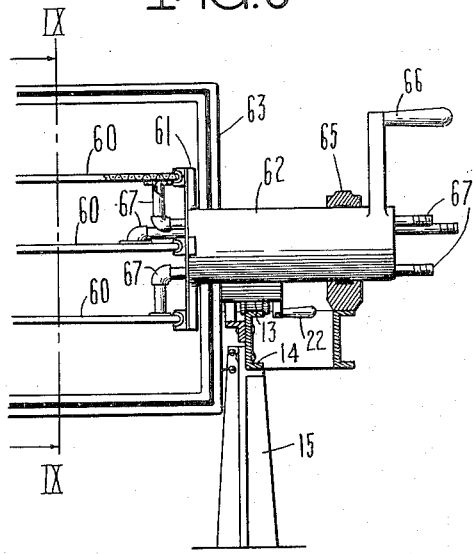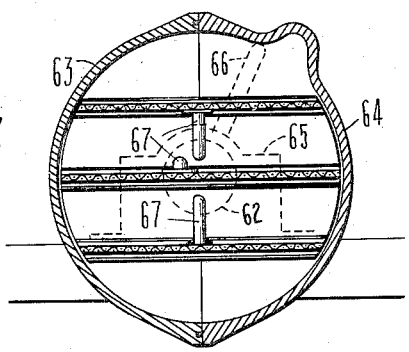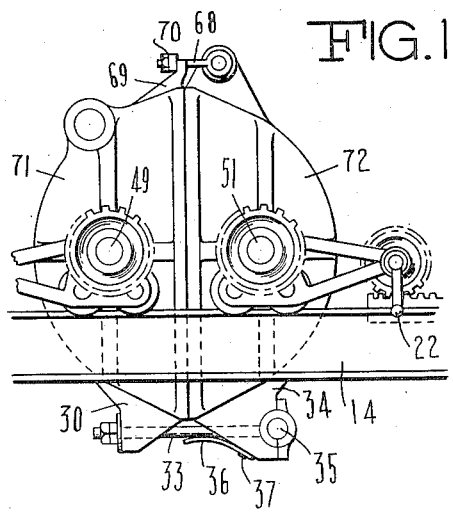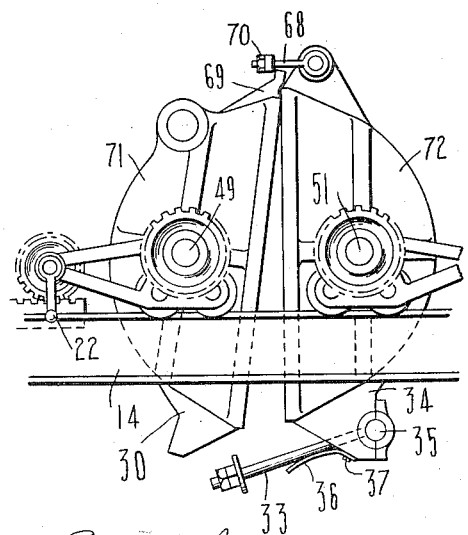

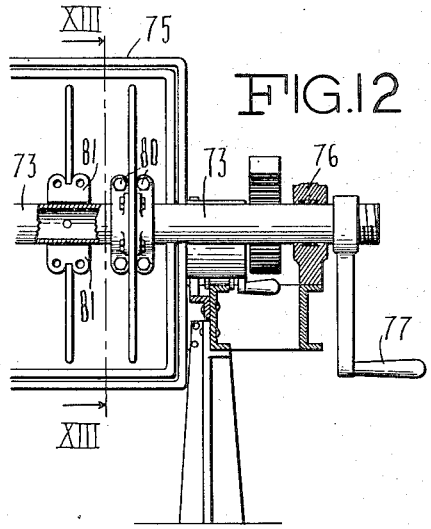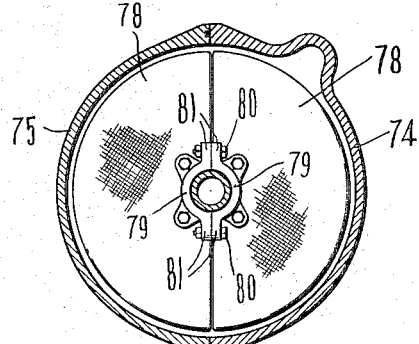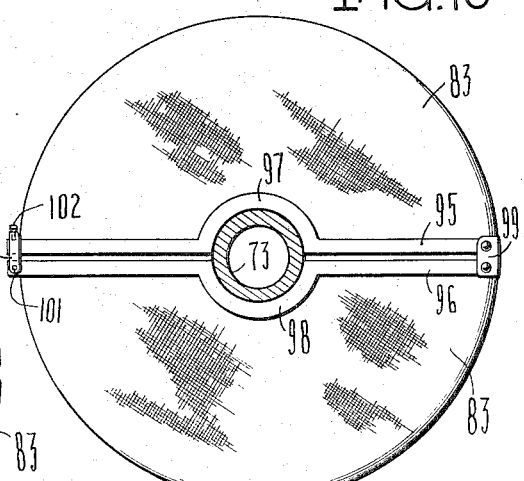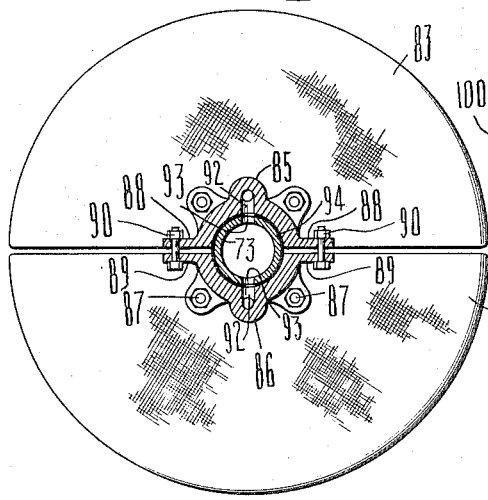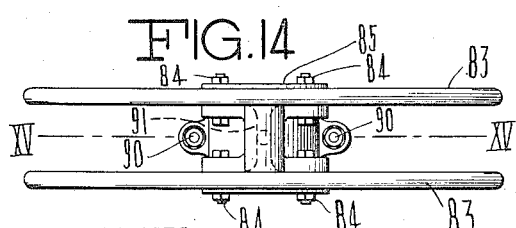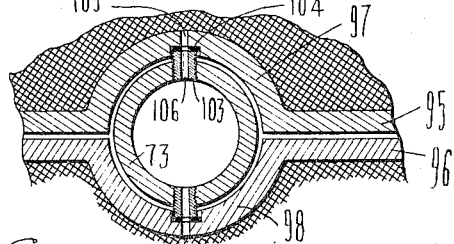

UNITED STATES PATENT OFFICE.

ERNEST J. SWEETLAND, OF MONTCLAIR, NEW JERSEY, ASSIGNOR, BY MESNE ASSIGNMENTS, TO UNITED FILTERS CORPORATION, A CORPORATION OF DELAWARE.

FILTER.

1,343,182.  Specification of Letters Patent.  Patented June 8, 1920.

Application filed March 15, 1915, Serial No. 14,313. Renewed June 6, 1919. Serial No. 302,291.

*To all whom it may concern:*

Be it known that I, ERNEST J. SWEETLAND, a citizen of the United States, residing in the town of Montclair, county of Essex, and State of New Jersey, have invented certain new and useful Improvements in Filters, of which the following is a specification.

My invention relates to an improved filter construction in which the sections of the shell or casing of the filter are separable in such a manner and are so supported that they may be readily moved away from the filter leaves or filter members in order to permit free access to the leaves for the purpose of cleaning, repair or replacement. My invention comprehends not only the structure of the shell and of the supporting means for it and for the filter leaves, but also certain automatic devices for governing the position of the shell during its movement toward or away from the filter leaves and also automatic means for locking the sections of the shell together in operative position, as well as improved filter leaf construction.

Figure 1:
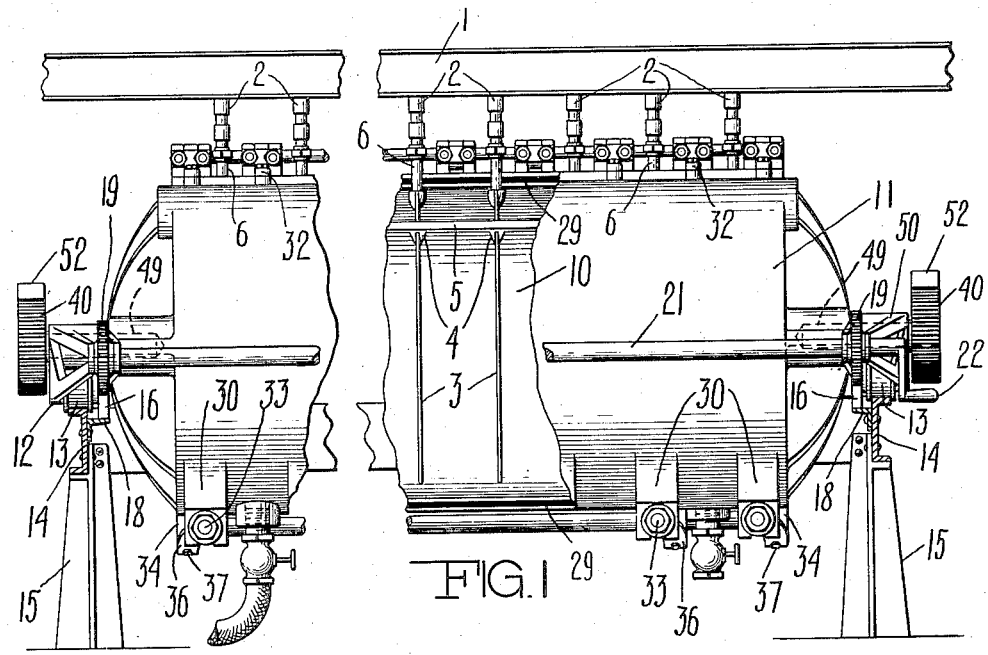
Figure 5:
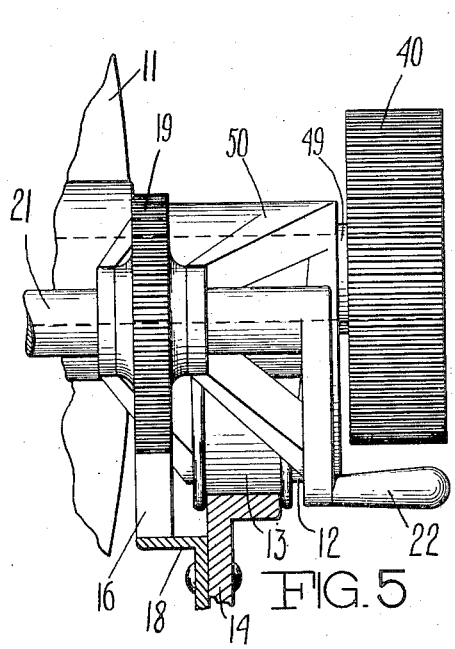
Figure 6:
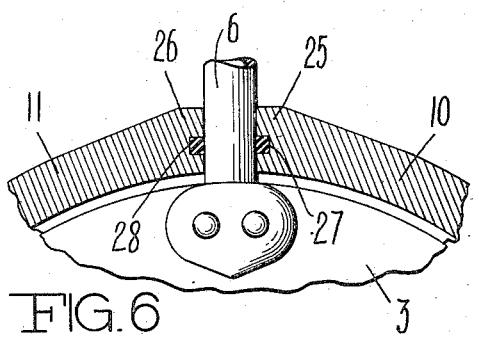
Figure 7:
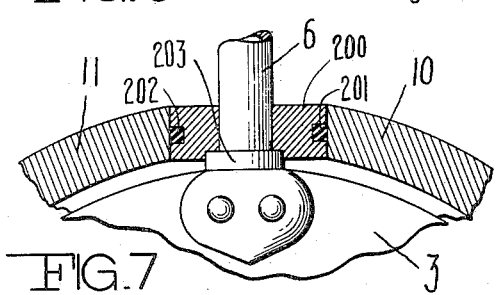

In the accompanying drawings, which form a part of the specification, Figure 1 is a side elevation, parts being broken away to show the internal construction of a filter illustrating one embodiment of my invention. Fig. 2 is an end view of this construction showing the parts in operative position for the process of filtration. Fig. 3 is an end view showing the filter leaves and the righthand section of the shell after it has been moved into extreme inoperative position. Fig. 4 is a similar end view showing the lefthand section of the shell removed to its lefthand position, but without having been tilted. Fig. 5 is an enlarged fragmentary view showing a portion of the operating mechanism and the means for supporting the adjacent section of the filter shell or casing. Fig. 6 is a fragmentary transverse sectional view showing the uppermost portion of the shell sections, filter leaf and conduit. Fig. 7 is a similar view showing a modification. Fig. 8 is an elevation, partly in section, showing a modification. Fig. 9 is a transverse sectional view on line IX—IX of Fig. 8. Fig. 10 is an end elevation of a modified form of filter casing in closed position and Fig. 11 is a similar view with one of the sections partly opened. Fig. 12 is an elevation showing a further modification. Fig. 13 is a transverse sectional view on line XIII—XIII of Fig. 12. Fig. 14 is a plan view of a modified form of filter unit with the casing removed. Fig. 15 is a transverse sectional view on line XV—XV of Fig. 14. Fig. 16 is a view similar to Fig. 15 showing a modification, and Fig. 17 is an enlarged, fragmentary, sectional view of one means of providing for communication between the interior of a filter leaf section and its drainage conduit.

Referring to the drawings in detail, and particularly Figs. 1 to 6 thereof, the numeral 1 designates a pair of channel beams, or other fixed members, which, by means of suitable hangers 2, support a plurality of filter leaves 3, or other suitable filtering devices. These filter leaves are preferably substantially circular in form, as clearly shown in Figs. 3 and 4, and may be provided with suitable lugs 4, to which are attached rods or bars 5, for the purpose of keeping the filter leaves in proper alinement with respect to each other and with respect to the filter casing. The general construction of the filter leaf shown in Figs. 1 to 6 does not form a part of my present invention and any suitable device of this general character may be employed, such, for instance, as that shown and described in detail in my prior U. S. Letters Patent No. 1,083,305, granted Jan. 6, 1914. In this type of leaf the filtrate is led through the outlet pipe 6, valve 7, and the glass tube 8 into the outlet manifold 9, the glass tube permitting the attendant to observe whether each individual filter leaf is operating properly and the valve permitting any one filter leaf to be cut out of commission in case of disability or other reasons.

The casing or shell of the filter consists of two hollow semi-cylindrical sections 10 and 11. Each end of each section is provided with a truck 12, having journaled therein the two flanged wheels or rollers 13, which are supported upon a rail 14, which may conveniently be in the form of a channel carried by any suitable support, such as the posts 15 shown in Fig. 1. Rigidly secured to the rails 14 on either side of the vertical median line of the filter are the straight racks 16 and 17, which may be carried upon brackets 18 mounted upon the web of the rail. Pinions or gears 19 mounted upon the truck 12, carried by the lefthand section of the filter shell, as illustrated in Figs. 2, 3 and 4, engage the rack 16, and similar pinions 20 carried in a similar manner by the righthand section of the shell mesh with the rack 17. The gears 19 are keyed to, or otherwise rigidly mounted upon a shaft 21 which connects them, and this shaft is supplied with a crank 22, by means of which the two gears 19 may be simultaneously rotated in either direction. A similar shaft 23 connects the gears 20 and is provided with a crank 24 for accomplishing the same purpose as does the crank 22.

The uppermost portion 25 of the shell section 10, and the corresponding portion 26 of the shell section 11, are provided with oppositely disposed semi-cylindrical apertures for the reception of the pipe 6. Gaskets 27 and 28 extending the entire length of the filter insure a tight joint between the pipes 6 and shell, and the upper edges of the shell where they meet, and likewise between the bottom abutting portions or edges of the shell sections and also to seal the joint along the vertical edges of the ends of the shell sections.

In order to clamp the sections of the shell tightly together against the high hydraulic pressures which are frequently used in pressure filters, I provide means including lugs 30 preferably cast integral with the bottom of the section 11 and lugs 31 carried by brackets 32 mounted upon the top of the section 11 and adapted to span the line of jointure between the two shell sections when the latter are in operative or closed position, as clearly shown in Fig. 2. Swing bolts 33 mounted upon lugs 34, which are preferably cast integral with the section 10, are utilized for engagement with the lugs 30 and may be operated by a cam shaft 35 in the manner described and claimed in my prior U. S. Letters Patent #1083305 issued Jan. 6, 1914. Since, in the present type of filter the bolts in closed position are horizontal instead of being vertical, as in the case of the structure described in my patent #1083305, I preferably add resilient means for urging the bolts into operative position. This may take the form of a spring 36, mounted upon each of the lugs 34, as by a single bolt 37. The outer end of each spring presses against one of the bolts 33 and urges it into the horizontal position. Each spring is preferably curved, as shown in Fig. 1, and may be readily swung to one side of the bolt 33 by rotating it about the bolt 37, when it is desired to disengage the spring from the bolt 33 for any reason.

A further series of swing bolts 38 mounted upon a cam shaft 39, engage the lugs 31, and any suitable means (not shown) may be employed for operating the two cam shafts 35 and 39, synchronously, if desired.

A gear 40 is journaled upon each of the trucks 12 attached to the lefthand shell member 11, and a similar gear 41 is attached to each of the trucks upon the right-hand shell section 10. These gears are located out of the line of contact with the racks 16 and 17. The gears 40 are adapted to engage the racks 42, which are mounted upon any suitable fixed support 43, preferably being hung therefrom by being pivoted at 44. The rack 42 and bar 45 together have the form of a bell-crank lever. In normal operative position the knee 46 of the structure is adapted to abut against a fixed part of the support, as shown in the drawings, and in this position the rack is further reinforced by a bar 47, which is pivoted to the fixed support at 48.

It is to be noted that the shafts 49 of the two gears 40 pass through a bearing 50 in the upper part of the truck 12 and enter the adjacent end of the shell section 11, the weight of which they thus support. The shafts 51 of the gears 41 are similarly journaled in their respective trucks 12 and enter and support the shell section 10. The gears 41 are adapted to mesh with racks 52 mounted upon a fixed support 53 in a manner identical with the mode of mounting the racks 42.

When it is desired to open the filter sections for the purpose of cleaning the filter members, or removing the sludge which may have been deposited within the interior of the casing during the process of filtration, the swing bolts 33 and 38 are rotated away from engagement with their respective lugs 30 and 31 in the manner described by my Patent #1,083,305 already referred to. This action disengages all physical connection between the filter sections and they are then free to move independently of each other. If the gears 20 are then rotated by means of the cranks 24, the shell section 10 will be caused to recede from the filter leaves, owing to the engagement of these gears with the racks 17, until the gears 41 engage the racks 52. Further progress of the shell section 10 will cause it to be tilted about the common axis of the shafts 51, upon which the gears 41 are mounted, since these gears will be rotated by their engagement with the fixed racks 52. This will bring the shell section 10 eventually into the position shown in Fig. 3 and in this position it is obvious that all sludge or other foreign matter deposited within the section will be automatically dumped into any receptacle below which may await its discharge. At the same time the section 10 will have progressed into a position sufficiently remote from the filter leaves to promote easy access of the latter, such position depending entirely upon the length of the racks 17 and the relative position of these racks and the racks 52.

It is obvious that by a similar operation, the shell section 11 may be caused to retreat from the filter leaves and to dump its contents automatically in an identical manner.

At times it may be desirable that the shell sections shall not swing about the axes of the shafts 49 and 51, respectively, and, in this case, the respective rack bars 42 and 52, or either of them, may be swung into the position shown in Fig. 4, in which the rack teeth will clear the gears 40 and 41, and the latter will not be rotated.

It is obvious that I may provide any suitable means, such as racks and gears, for operating the two shafts, simultaneously in opposite directions in order to move the shell sections into or out of normal working position in unison and by a single operation.

Fig. 7 shows a modification in which the top edges of the shell sections 10 and 11 abut against a narrow stationary strip 200 through which the pipes 6 pass. This is provided with the gaskets 201, 202 for making a tight joint with the edges of the filter sections and with a partially countersunk gasket 203 around each of the pipes 6.

In Figs. 8 and 9 I have illustrated a form of filter which is desirable for use in certain cases where it is difficult to obtain a cake upon a vertically disposed filter leaf. In this form of device I provide a plurality of horizontal filter members 60, the internal construction of which may be similar to that of the filter leaves already described. These filter members or plates are normally supported in a horizontal position by a frame 61, which in turn is carried by a hollow shaft 62 passing through the ends of the filter sections 63 and 64. At its outer end this shaft is supported in bearings 65, and is provided with a crank 66. Drainage pipes 67 lead from the various filter plates through the shaft and may be caused to discharge in a convenient place. It will be apparent that in this form of device the sludge or residue from the process of filtration will be deposited upon the top of each of the plates 60. As soon as a sufficient deposit is obtained the filter casing sections 63 and 64 may be separated. If the crank or handle 66 is then swung through an arc of 90° the three filter plates will be brought into vertical position and the sludge or residue thereby caused to drop into any convenient receptacle, after which the plates may be returned to their initial position, the filter casing sections locked together and the process of filtration continued.

In Figs. 10 and 11 is shown a modified form of filter casing construction in which the upper locking bolts 68, corresponding to the bolts 38, are normally stationary and have a substantially horizontal position. The lugs 69 which engage the yokes 70, carried by the bolts 68 are given the peculiar configuration illustrated in Figs. 10 and 11, so that after the release of the lower locking means which fasten the lower edges of the filter sections together in operative position the movement of the lefthand filter section 71 away from its companion section 72 which may be accomplished by turning the left-hand crank 22, the section 71 will tilt about the axis of the shaft 49 by which it is supported, coming into approximately the position shown in Fig. 11, in which the lugs will clear the yokes. Both of the sections 71 and 72 are then free to move along the rails 14, just as in the case of the construction shown in Figs. 1 and 2.

Instead of supporting the filter leaves by a vertical suspension, as illustrated in Figs. 1 to 7, inclusive, the filter leaves may be supported upon a central pipe, as illustrated in Figs. 12 and 13. This construction has certain advantages in that it does away with the necessity for numerous curved gaskets in connection with the upper edge of the filter sections where they embrace the outlet pipes of the filter leaves in the construction first described. In the alternative form of construction a pipe 73 extends longitudinally through the center of the filter compartment formed by the two semi-cylindrical filter sections 74 and 75. This pipe may be supported in suitable bearings 76 at either end of the casing and external thereto and may also be provided with a crank 77 by which it may be rotated. Upon this pipe at intervals within the filter casing are clamped semi-circular filter leaf sections 78. Each filter leaf section is carried by one-half 79 of a split collar formed for engagement with the pipe 73. When two filter leaf sections are placed opposite each other upon the pipe, the abutting split collar sections may be clamped together by means of bolts 80 passing through their flanges 81.

Figs. 14 and 15 represent a modified type of filter unit comprising four semi-circular filter leaf sections 83. Two of these sections are secured by means of bolts 84 to one-half 85 of a split collar, to the other half 86 of which are secured the other two filter leaf sections by means of the bolts 87. The section 85 of the collar is provided with the flanges 88 and the collar section 86 is provided with a similar flange 89. The collar sections, and, consequently, the opposite pairs of filter leaf sections carried by them, are adapted to be clamped on the pipe 73 by means of bolts 90 passing through the flanges. Each collar section is provided with a preferably cored-out passage 91, communicating with the interior of the two filter sections carried by that particular collar section, and this passage, in turn, communicates with a passage 92 adapted to register with an aperture 93 through the pipe 73. A gasket 94 provided with openings registering with the apertures 93 is interposed between the inner periphery of the collar sections and the outer periphery of the pipe to make a fluid-tight joint.

Fig. 16 illustrates a further modification in which the semi-circular filter sections 83 are secured to bars or frames 95 and 96, curved at 97 and 98 respectively to embrace the periphery of the pipe 73. At one end these bars are connected by a hinge 99 and at the other end are adapted to be secured together by means of a latch 100, comprising a loop of metal hinged at 101 to the bar 96 and adapted to slip over the projecting end of the bar 95, thereby clamping the bars tightly over the periphery of the pipe 73. A set screw 102, or other adjusting means, may be provided for controlling the degree of pressure between the bars and the pipe.

Fig. 17 shows a convenient method of providing communication between the interior of a semi-circular or segmental filter leaf and the conduit 73, and is adaptable to all forms of such filter leaves shown, although it will be described explicitly with reference to the type shown in Fig. 16.

In this construction the aperture 93 is provided with a nipple 103 which is screwed into the pipe at the desired point and which projects slightly beyond its periphery. This nipple is adapted to engage a circular washer or gasket 104, which may be countersunk in the frame 95 or in the other means by which the filter leaf section is supported. The passage 105, corresponding in function to the passages 92, leads from this gasket to the interior of the filter section and registers with the passage through the nipple 103. It will be seen that this type of construction obviates the necessity for a gasket such as 94 completely encircling the pipe or conduit 73.

While I have illustrated only certain preferred embodiments of my invention, I realize that my invention is susceptible of wide adaptation and modification and I do not desire to be limited to the precise means shown and described.

Having thus described my invention, I claim:

1. In a filter, a filter member, a filter casing divided into complemental sections, means for fixably supporting the filter member independently of the casing, and means for bodily moving the casing sections linearly toward and away from the filter member.

2. In a filter, a filter member, a filter casing divided into complemental sections, means for fixably supporting the filter member independently of the casing, means for bodily moving the casing sections linearly toward and away from each other, and means for tilting the casing sections while in a separated position.

3. In a filter, a filter member, a filter casing inclosing the filter member and divided into complemental sections, members fixedly supporting the filter member and projecting between the members of the casing, and means for bodily moving the casing sections linearly toward and away from the filter member.

4. In a filter, a filter member, pipes fixedly supporting the filter member, a filter casing inclosing the filter member and divided into complemental sections which loosely receive the supporting pipes between the meeting edges thereof, and means for bodily moving the casing sections linearly toward and away from the filter member.

5. In a filter, a filter member, pipes fixedly supporting the filter member, a filter casing inclosing the filter member and divided into complemental sections which loosely receive the supporting pipes between the meeting edges thereof, means for bodily moving the casing sections toward and away from the filter member, and means for tilting the casing sections.

6. In a filter, a filter member, means for fixedly supporting the filter member, a filter casing divided into complemental sections and normally housing the filter member, tracks at opposite sides of the casing, carriages movable upon the tracks and supporting the respective casing sections, and means for moving the carriages to move the casing sections linearly toward and away from the filter member.

7. In a filter, a filter member, means for fixedly supporting the filter member, a filter casing divided into complemental sections and normally housing the filter member, tracks at opposite sides of the casing, carriages movable upon the tracks and supporting the respective casing sections, means for actuating the carriages to separate the casing sections, and means for fitting the casing sections after they have been separated.

8. In a filter, a filter member, pipes fixedly supporting the filter member, a filter casing divided into complemental sections and normally housing the filter member, the supporting pipes being received between the meeting edges of the casing sections, carriages carrying the respective casing sections, tracks supporting the carriages, and means for actuating the carriages to move the casing sections toward and away from the filter member.

9. In a filter, a filter member, a filter casing housing the filter member and formed in complemental sections, means for bodily moving one of the casing sections linearly toward and away from the other casing section, and means for tilting the said casing section.

10. In a filter, a filter member, a filter casing divided vertically into a plurality of sections, means for tiltably supporting said member independently of the casing and supporting means for said sections permitting the separation thereof and permitting said sections to tilt in opposite directions after separation to discharge the contents thereof.

11. In a filter, a filter casing divided vertically into a plurality of sections, supporting means for said sections permitting the linear separation thereof and means for causing said sections to tilt at a given point in their travel.

12. In a filter, a filter casing divided vertically into a plurality of sections, supporting means for said sections permitting the horizontal separation thereof and means for causing said sections to tilt at a given point in their travel.

13. In a filter, a filter casing divided vertically into a plurality of sections, supporting means for said sections permitting the linear separation thereof and means for causing said sections to tilt in opposite directions.

14. In a filter, a filter member, means for supporting said member in stationary position, a filter casing divided into a plurality of sections and means for supporting said sections independently of the support of said member, said means permitting the linear bodily separation of said sections.

15. In a filter, a filter member, means for supporting said member in stationary position, a filter casing divided into a plurality of sections and means for supporting said sections independently of the support of said member, said means permitting the separation of said sections in a horizontal direction.

16. In a filter, a filter casing divided vertically into a plurality of sections, supporting means for said sections permitting them to advance toward or recede from each other, and means for automatically causing said sections to tilt at a given point in their travel when separating and to resume their initial position upon returning from said point in their travel.

17. In a filter, a filter casing divided vertically into a plurality of mutually separable sections, supporting means for said sections permitting the separation thereof in a horizontal direction and releasable locking means at the top and bottom of said sections.

18. In a filter, a filter casing divided vertically into a plurality of sections, supporting means for said sections permitting the separation thereof in a horizontal direction, rigid interengaging locking members along one pair of abutting edges of said sections for detachably locking the same together and releasable locking means located along the opposite abutting edges of the sections and including a movable element.

19. In a filter, a filter casing divided vertically into a plurality of sections, supporting means for said sections permitting the separation thereof in a horizontal direction, rigid interengaging locking members along one pair of abutting edges of said sections for detachably locking the same together and releasable locking means located along the opposite abutting edges of said sections and including a movable element, one of said sections being capable of movement about an axis to cause the disengagement of said rigid locking members.

20. In a filter, a filter casing divided vertically into a plurality of sections, supporting means for said sections permitting the separation thereof, rigid interengaging locking members along one pair of abutting edges of said sections for detachably locking the same together and releasable locking means located along the opposite abutting edges of the sections and including a movable element.

21. In a filter, a filter casing divided vertically into a plurality of sections, supporting means for said sections permitting the separation thereof, rigid interengaging locking members, means along one pair of abutting edges of said sections for detachably locking the same together and releasable locking means located along the opposite abutting edges of said sections and including a movable element, one of said sections being capable of movement about an axis to cause the disengagement of said fixed locking means.

22. In a filter, a filter casing divided vertically into a plurality of sections, supporting means for said sections permitting the separation thereof and locking means including a rigid member on one of said sections adapted to span the joint between said sections, a complemental rigid member on the other section adapted to interlock with said spanning member, and releasable means for locking the sections along an opposite edge thereof.

23. In a filter, a filter member, means for fixably supporting the filter member, a sectionalized filter casing normally housing the filter member and means for bodily moving a section of the casing linearly away from the filter member and means for tilting said section while in separated position.

24. In a filter, a filter member, a sectionalized casing normally housing said filter member and means for fixably supporting the filter member independently of the casing and means for bodily moving a section of the casing linearly away from the filter member and means for tilting said casing while in separated position.

E. J. SWEETLAND.